(12) United States Patent
Ghike et al.

(10) Patent No.: US 10,161,506 B2
(45) Date of Patent: Dec. 25, 2018

(54) HYDRAULIC CONTROL SYSTEM FOR AN AUTOMATIC TRANSMISSION WITH ELECTRONIC TRANSMISSION RANGE SELECTION

(71) Applicant: GM Global Technology Operations LLC, Detroit, MI (US)

(72) Inventors: Chinar S. Ghike, Farmington Hills, MI (US); Brian W. Whitmarsh, Commerce, MI (US); Joel H. Gunderson, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 272 days.

(21) Appl. No.: 15/199,141

(22) Filed: Jun. 30, 2016

(65) Prior Publication Data

US 2018/0003295 A1    Jan. 4, 2018

(51) Int. Cl.

| | |
|---|---|
| F16H 61/02 | (2006.01) |
| F16H 61/00 | (2006.01) |
| F16H 63/34 | (2006.01) |
| F15B 15/28 | (2006.01) |
| F16H 57/04 | (2010.01) |
| F16H 61/14 | (2006.01) |
| F16H 61/12 | (2010.01) |

(52) U.S. Cl.
CPC ..... *F16H 61/0206* (2013.01); *F15B 15/2815* (2013.01); *F16H 57/0412* (2013.01); *F16H 61/0021* (2013.01); *F16H 61/0025* (2013.01); *F16H 61/0031* (2013.01); *F16H 63/3483* (2013.01); *F16H 61/14* (2013.01); *F16H 2061/0253* (2013.01); *F16H 2061/1232* (2013.01)

(58) Field of Classification Search
None
See application file for complete search history.

(56) References Cited

U.S. PATENT DOCUMENTS

| | | | | |
|---|---|---|---|---|
| 5,682,791 | A * | 11/1997 | Liesener | F16H 61/12 477/906 |
| 8,435,148 | B2 * | 5/2013 | Moorman | F16D 48/0206 475/116 |
| 2010/0326542 | A1 * | 12/2010 | Xie | F16H 61/0206 137/487.5 |
| 2011/0168509 | A1 * | 7/2011 | Moorman | F16H 61/0031 192/3.3 |

* cited by examiner

*Primary Examiner* — Mark A Manley (57) ABSTRACT

A hydraulic control system for a multiple speed motor vehicle automatic transmission having electronic transmission range selection (ETRS) provides both a forward gear ratio and Park options during default conditions where the transmission loses electronic control when the ETRS system is in a drive mode. The hydraulic control system includes a two position default disable solenoid valve, an ETRS valve, a park servo, position sensors, a default disable valve, a drive select valve, various orifices and blow-off valves as well as main and auxiliary pumps, a torque converter, a torque converter regulator and control valve and a plurality of linear force solenoid valves and clutch regulation valves which control a like plurality of clutch and brake actuators.

17 Claims, 13 Drawing Sheets

HYDRAULIC CONTROL SYSTEM FOR AN AUTOMATIC TRANSMISSION WITH ELECTRONIC TRANSMISSION RANGE SELECTION

FIELD

The present disclosure relates to hydraulic control systems for automatic motor vehicle transmissions and more particularly to hydraulic control systems for automatic motor vehicle transmissions having electronic transmission range selection (ETRS) which defaults to a preselected gear.

BACKGROUND

The statements in this section merely provide background information related to the present disclosure and may or may not constitute prior art.

Modern motor vehicle automatic transmissions, especially those for passenger cars, sport utility vehicles and light trucks typically include a plurality of interconnected planetary gear assemblies which cooperate with friction clutches and brakes to provide a sequence of forward gears and reverse. Just as typically, the clutches and brakes are controlled by hydraulic actuators or operators controlled by the outputs of a plurality of spool valves in a valve body which are, in turn, controlled by solenoids under the control of a transmission control module (TCM).

The transmission generally operates in one of a plurality of modes of operation including out-of-Park driving modes and a Park mode. The out-of-Park driving modes include forward gears or speed ratios, i.e., Drive mode, at least one reverse gear or speed ratio, i.e., a Reverse mode, and a Neutral mode. Selection of the various driving modes is typically accomplished by engaging a shift lever or other driver interface device that is connected by a shifting cable or other mechanical connection to the transmission. Alternatively, the selection of a driving mode may be controlled by an electronic transmission range selection (ETRS) system, also known as a "shift by wire" system. In an ETRS system, selection of the driving modes is accomplished through electronic signals communicated between the driver interface device, the transmission control module and the transmission. The ETRS system reduces mechanical components, increases instrument panel space, enhances styling options, and eliminates the possibility of shifting cable misalignment with mechanical transmission range selection components.

While previous ETRS subsystems are useful for their intended purpose, there is a need for new and improved ETRS hydraulic control system configurations within transmissions which exhibit improved performance, especially during transmission default conditions. A default condition is a hydraulic state that the transmission experiences in the absence of electronic control. A transmission in default no longer has the capability to electronically command solenoids to achieve the desired gear state. The default condition may have been intentionally commanded (e.g. when diagnostics indicate corrupt solenoid drivers, corrupt controllers, controller shutdown at high temperatures) or can occur unintentionally due to a hardware failure (e.g. controller failure, wiring harness failure, solenoid driver failure). For some transmission configurations, the hydraulic control system shifts the transmission to neutral or park during a default condition. While a shift to neutral or park is preferable to random, uncontrolled operation of the transmission, there is a need for an improved ETRS hydraulic control system for use in a hydraulically actuated automatic transmission that can provide multiple drive states during a default condition.

SUMMARY

A hydraulic control system for a multiple speed motor vehicle automatic transmission having electronic transmission range selection (ETRS) is provided. The hydraulic control system provides both a forward gear ratio and Park options during default conditions where the transmission loses electronic control when the ETRS system is in a drive mode. The hydraulic control system includes a two position (on-off) default disable solenoid valve, an ETRS valve, an ETRS or Park servo, position sensors, a default disable valve, a drive select valve, various orifices and blow-off valves as well as main and auxiliary pumps, a torque converter, a torque converter regulator and control valve and a plurality of linear force solenoid valves and clutch regulation valves which control a like plurality of clutch and brake actuators.

Thus it is an aspect of the present invention to provide a motor vehicle automatic transmission having a hydraulic control system including an ETRS system.

It is a further aspect of the present invention to provide a motor vehicle automatic transmission having a hydraulic control system, an ETRS system and two modes of default operation.

It is a still further aspect of the present invention to provide a motor vehicle automatic transmission having a hydraulic control system, an ETRS default system including a default disable (on/off) solenoid valve, an ETRS valve, a Park servo, a default disable valve and a drive select valve.

It is a still further aspect of the present invention to provide a motor vehicle automatic transmission having a hydraulic control system and an ETRS and default subsystem including a default disable (on/off) solenoid, an ETRS valve, a Park servo, a default disable valve and a drive select valve which provides two modes of default operation.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
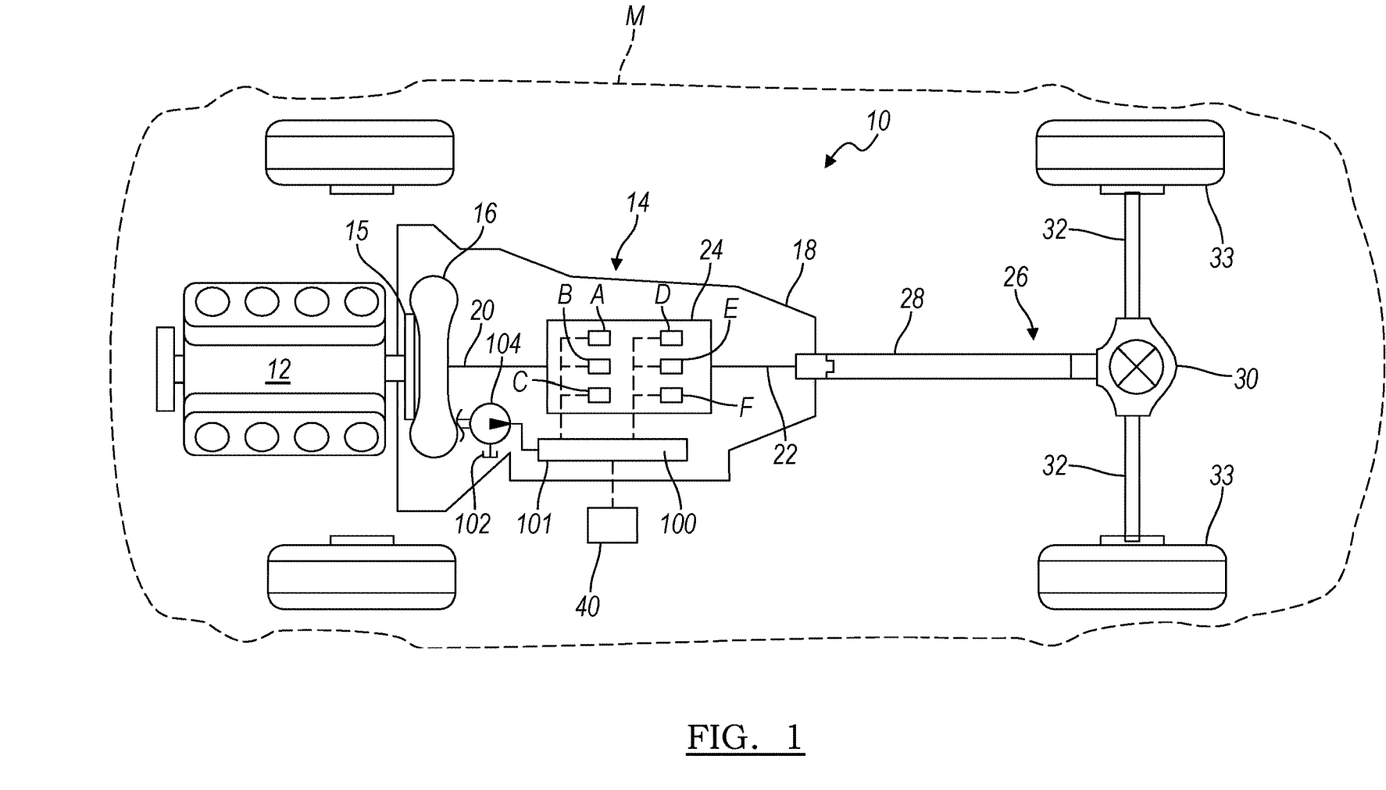
FIG. 1 is a schematic plan view of a motor vehicle powertrain incorporating the present invention.

With reference to FIG. 1, a motor vehicle is shown and generally indicated by reference letter M. The motor vehicle M illustrated is a passenger car, but it should be appreciated that it may be any type of vehicle, such as a truck, van, sport-utility vehicle, etc. The motor vehicle M includes a powertrain 10. It should also be appreciated that while a rear-wheel drive powertrain is illustrated, the motor vehicle M may have a front-wheel drive powertrain without departing from the scope of the present invention. The powertrain 10 generally includes an engine 12 connected to an automatic transmission 14.

The engine 12 may be a conventional internal combustion engine or an electric engine, hybrid engine, or any other type of prime mover, without departing from the scope of the present disclosure. The engine 12 supplies driving torque to the transmission 14 through a flexplate 15 or other connecting device that is connected to a launch or starting device 16. The launch or starting device 16 may be a hydrodynamic device, such as a fluid coupling or torque converter, a wet dual clutch, a dry launch clutch or an electric motor.

The transmission 14 has a typically cast, metal housing 18 which encloses and protects the various components of the transmission 14. The housing 18 includes a variety of apertures, passageways, shoulders and flanges which position and support these components. The transmission 14 includes a transmission input shaft 20 and a transmission output shaft 22. Disposed between the transmission input shaft 20 and the transmission output shaft 22 is a gear, clutch and brake arrangement 24. The transmission input shaft 20 is operably connected to the engine 12 through the launch or starting device 16 and receives input torque or power from the engine 12. Accordingly, the transmission input shaft 20 may be a turbine shaft in the case where the starting device 16 is a hydrodynamic device, dual input shafts where the starting device 16 is a dual clutch, or a drive shaft where the starting device 16 is an electric motor. The transmission input shaft 20 is coupled to and provides drive torque to the gear, clutch and brake arrangement 24. The transmission output shaft 22 is preferably connected with a final drive unit 26 which includes, for example, a propshaft 28, a differential assembly 30, and a pair of drive axles 32 connected to a pair of wheels 33.

The gear and clutch arrangement 24 includes a plurality of gear sets, six torque transmitting mechanisms indicated schematically by reference letters A-F, and a plurality of shafts or quills. The plurality of gear sets may include meshing gear sets, such as planetary gear sets, that are connected to or selectively connectable to the plurality of shafts through the selective actuation of the plurality of clutches and brakes. The plurality of shafts may include layshafts or countershafts, sleeve and center shafts, reverse or idler shafts, or combinations thereof. The torque transmitting mechanisms A through F are selectively engageable in various combinations to initiate one of a plurality of forward gear or speed ratios and one reverse gear or speed ratio by selectively coupling or braking individual gears within the plurality of gear sets to the plurality of shafts or ground. In a preferred example, torque transmitting mechanisms A and B are friction brakes while torque transmitting mechanisms C through F are friction clutches. It should be appreciated that the specific arrangement and number of the gear sets and shafts within the transmission 14 may vary without departing from the scope of the present disclosure.

The motor vehicle M includes a transmission control module 40. The transmission control module 40 is preferably a non-generalized, electronic control device having a preprogrammed digital computer or processor, control logic or circuits, memory used to store data, and at least one I/O peripheral. The control logic includes or enables a plurality of logic routines and subroutines for monitoring, manipulating, and generating data and control signals. The transmission control module 40 controls the actuation of the torque transmitting mechanisms A through F via a hydraulic control system 100.

The hydraulic control system 100 is disposed within a valve body 101 that contains and houses, within valve bores and fluid paths, the majority of the components of the hydraulic control system 100. These components include, but are not limited to, pressure regulation valves, directional (check) valves, solenoids, etc. The valve body 101 may be attached to a bottom of the transmission housing 19 in rear-wheel drive transmissions or attached to a front of the transmission housing 19 in front-wheel drive transmissions. The hydraulic control system 100 is operable to selectively engage the clutches and brakes A through F and to provide cooling and lubrication to the transmission 14. by selectively communicating a hydraulic fluid from a sump 102 under pressure from either an engine driven pump 104 or an accumulator (not shown) or auxiliary electric pump 106.

Figure 2A:
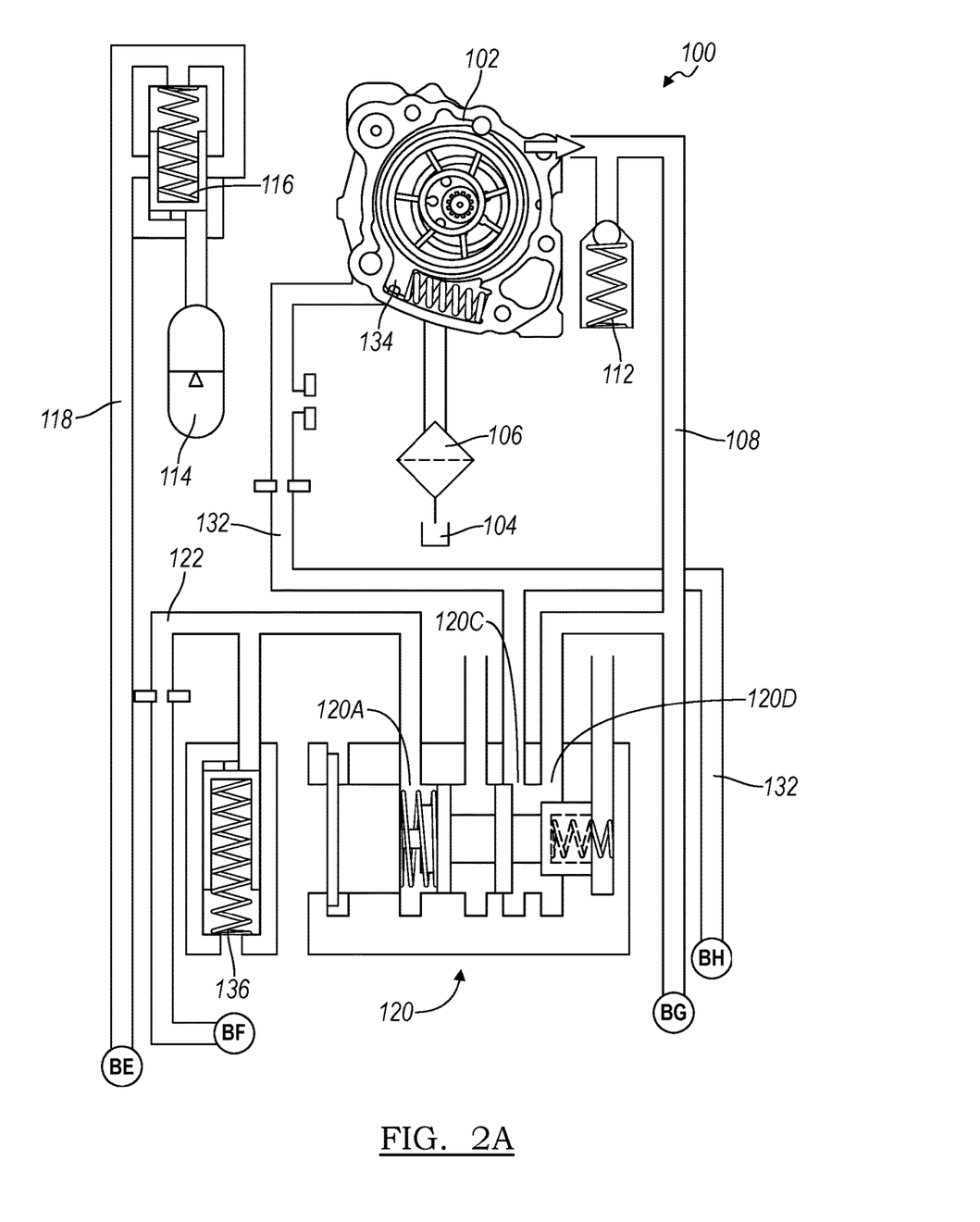
FIGS. 2A through 2L are component and flow diagrams of a hydraulic control system according to the present invention.
Figure 2B:
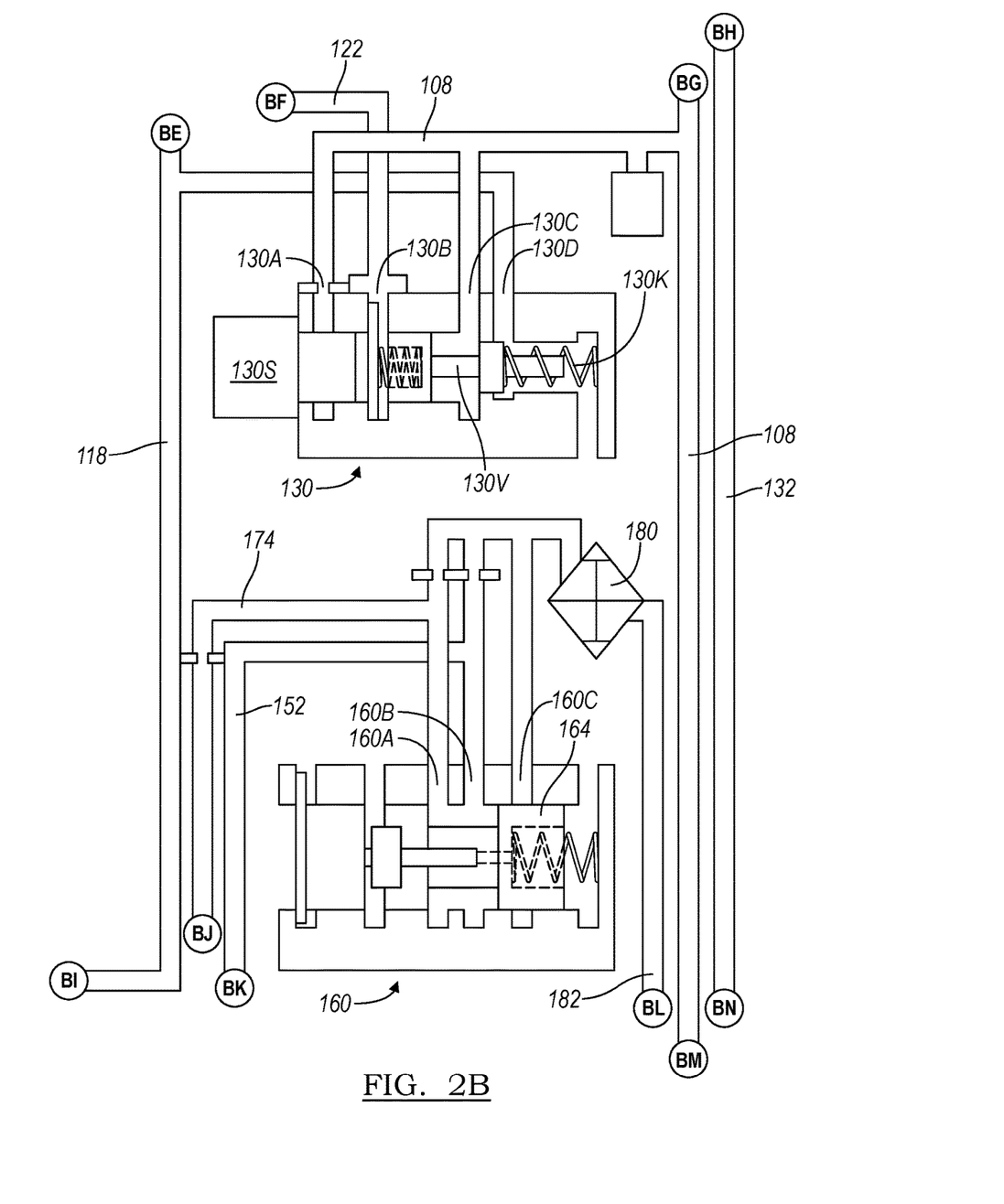
Figure 2C:
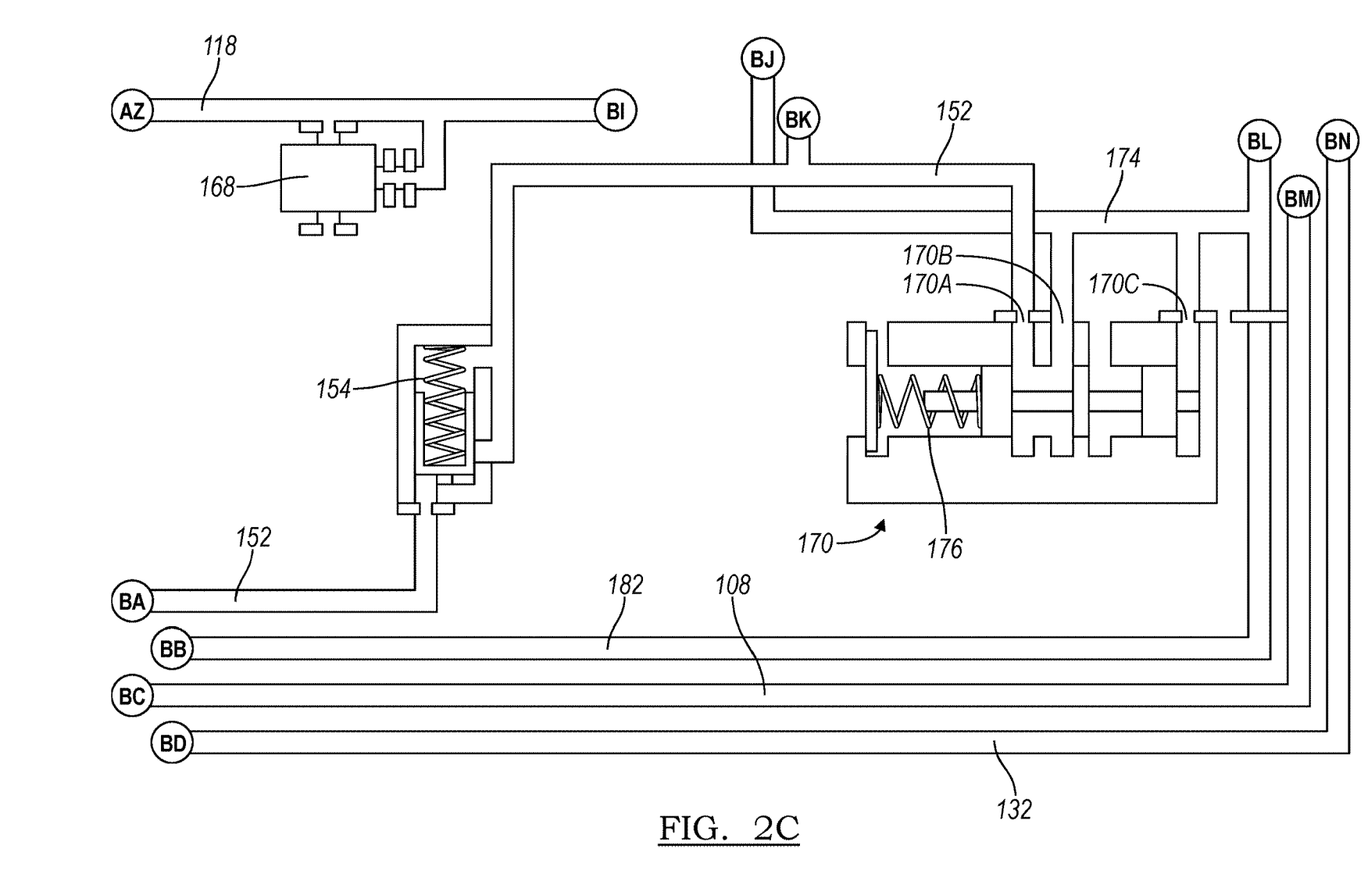
Figure 2D:
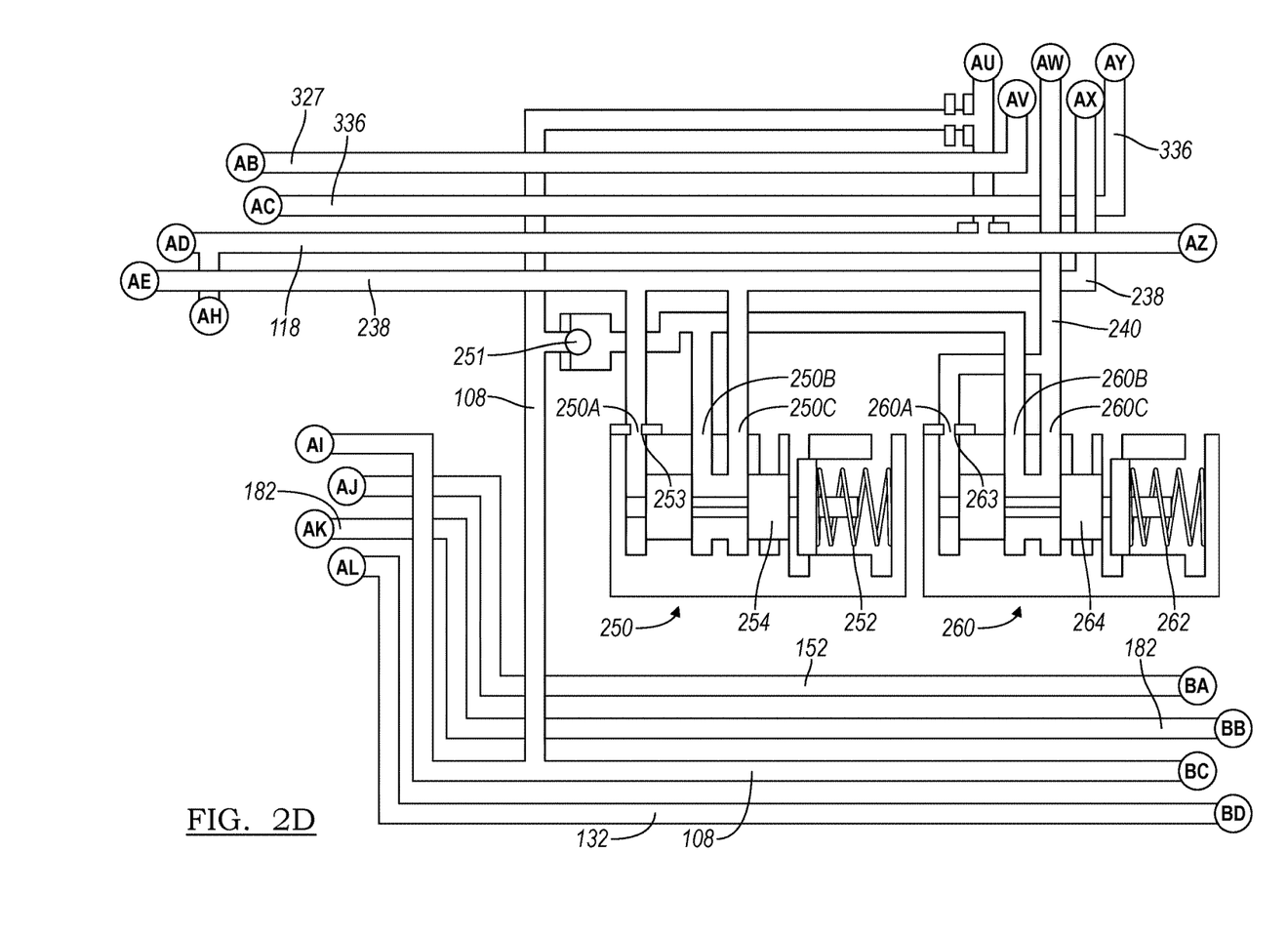
Figure 2E:
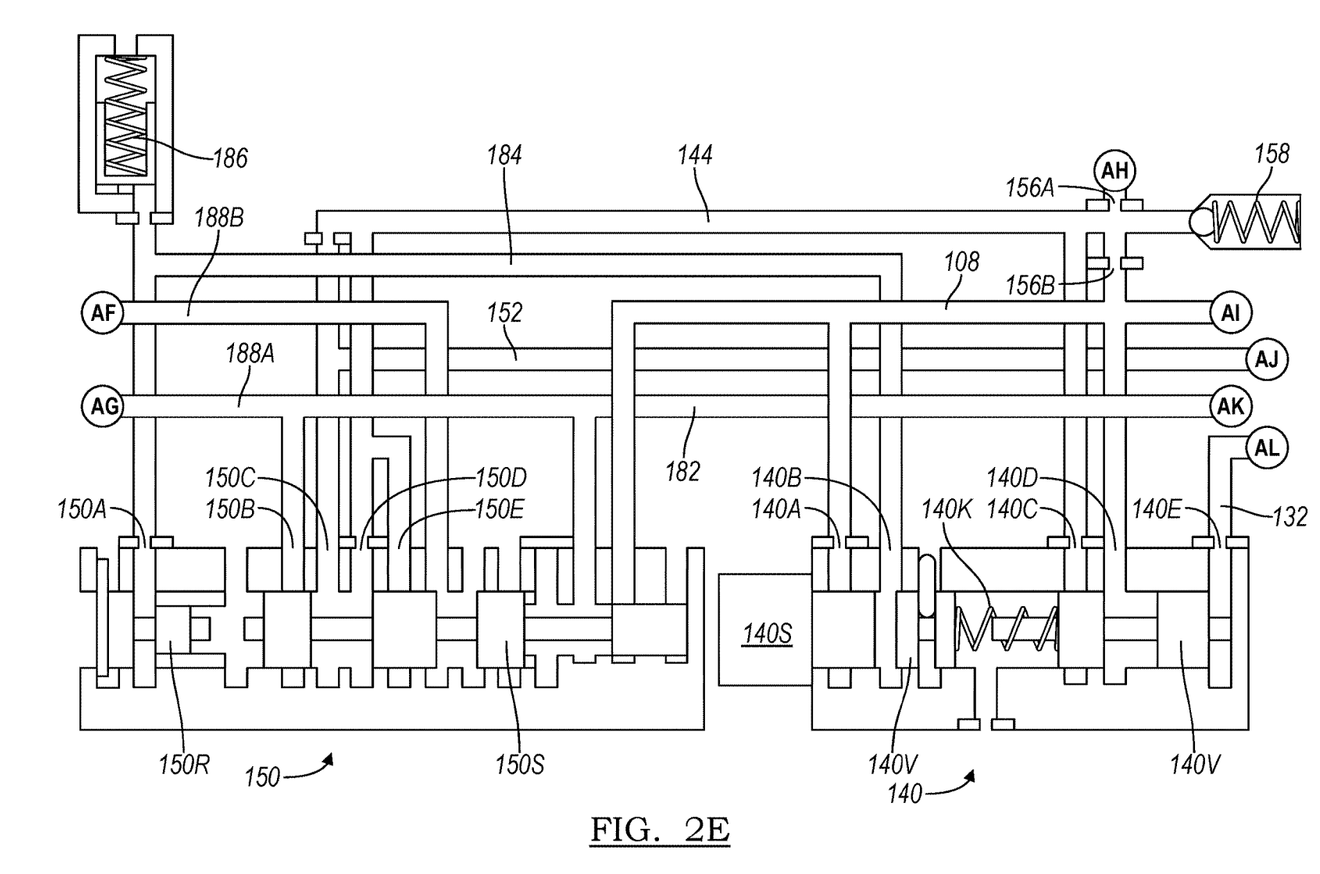
Figure 2F:
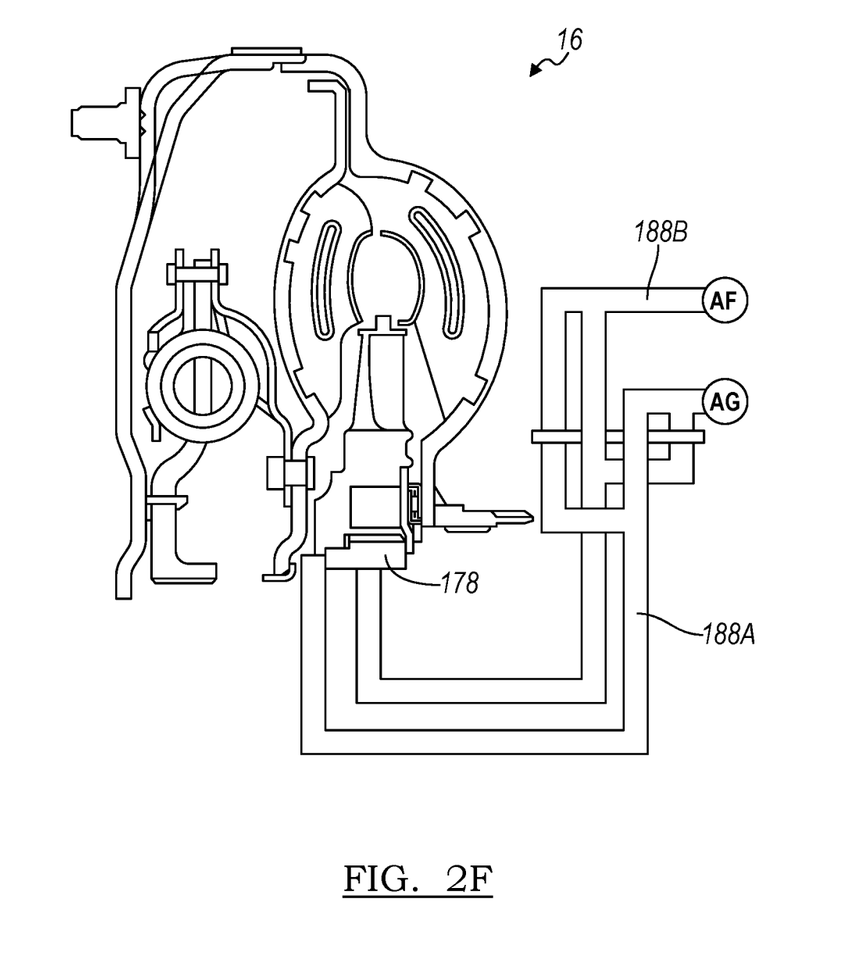
Figure 2G:
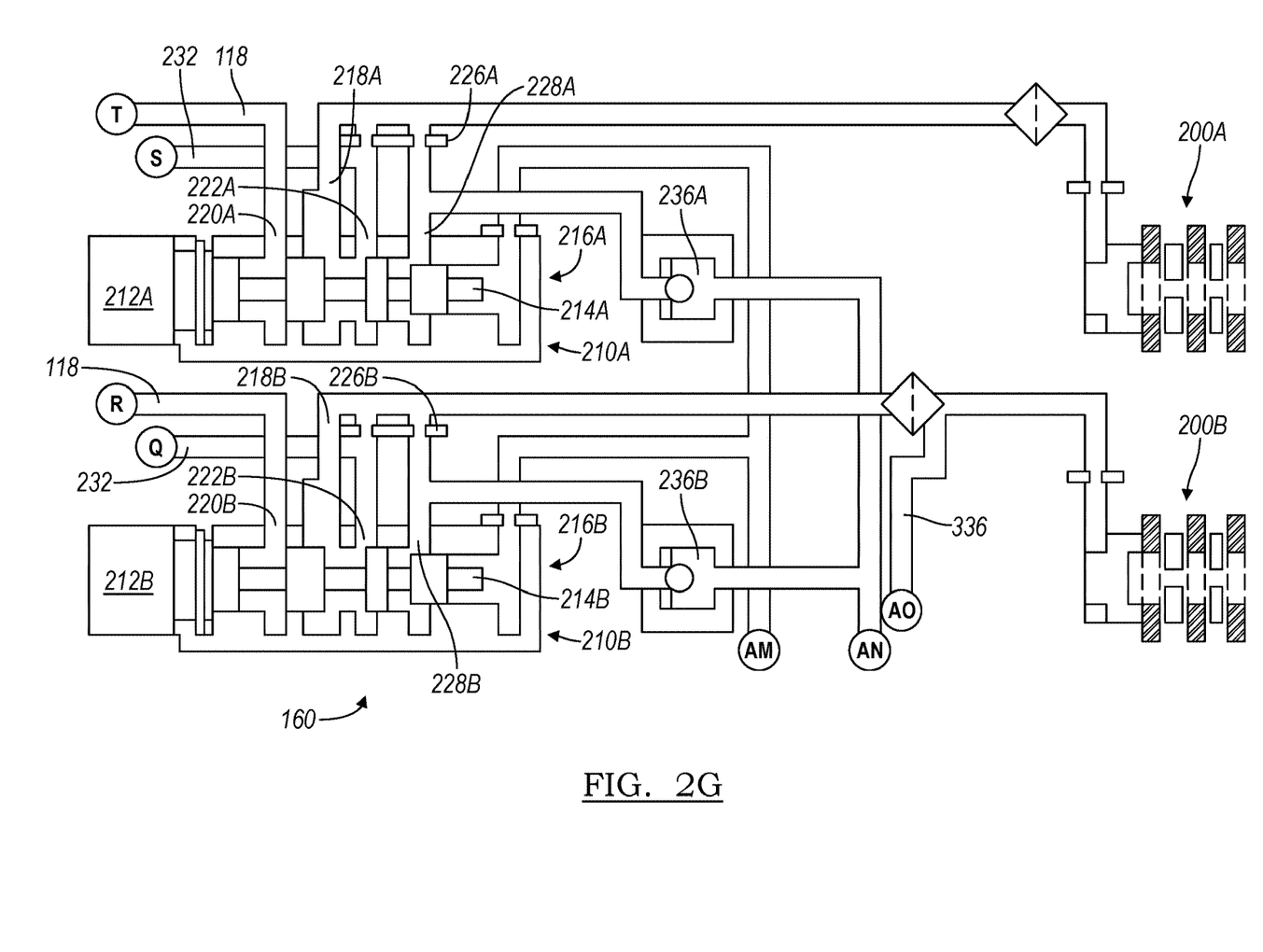
Figure 2H:
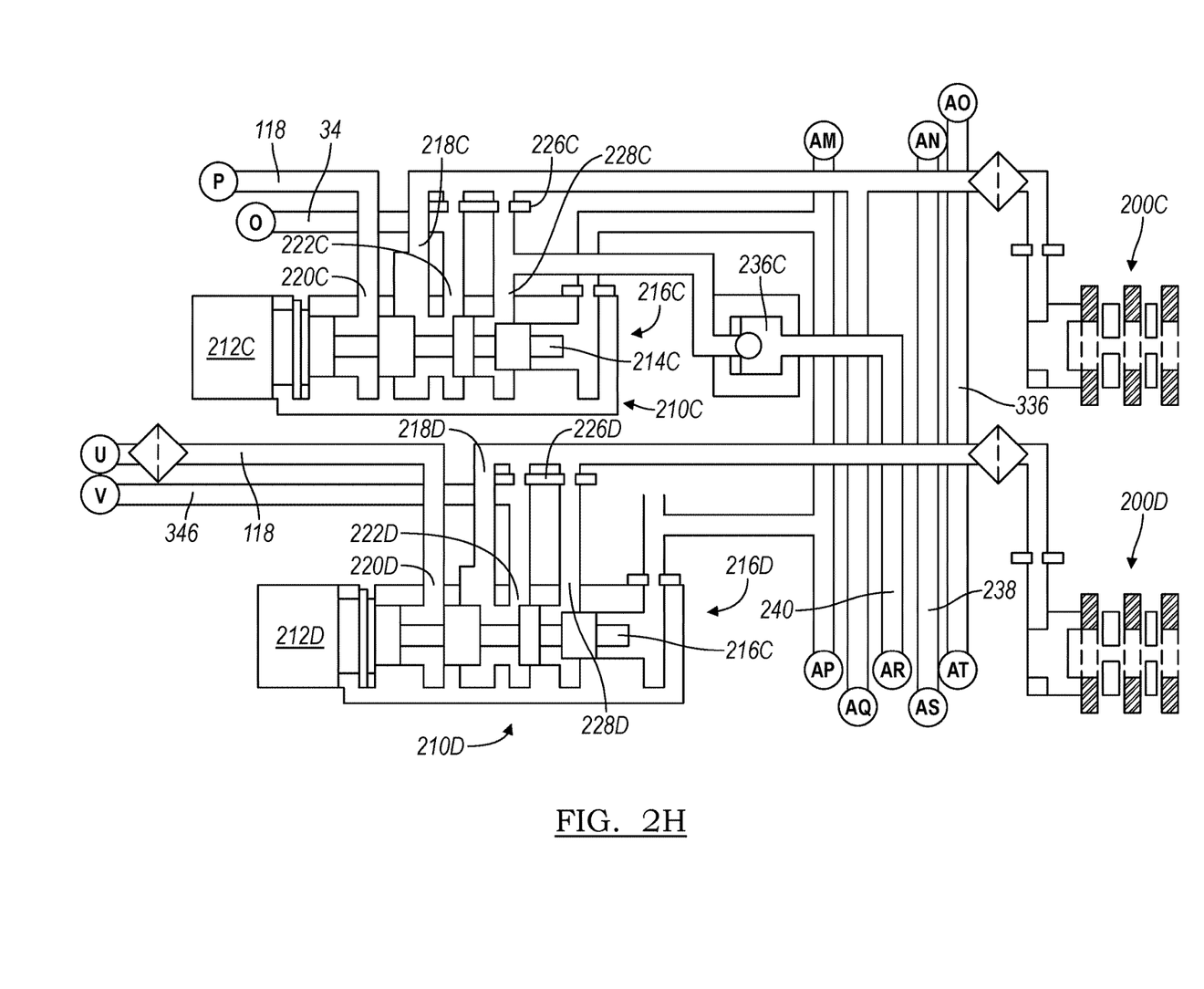
Figure 2I:
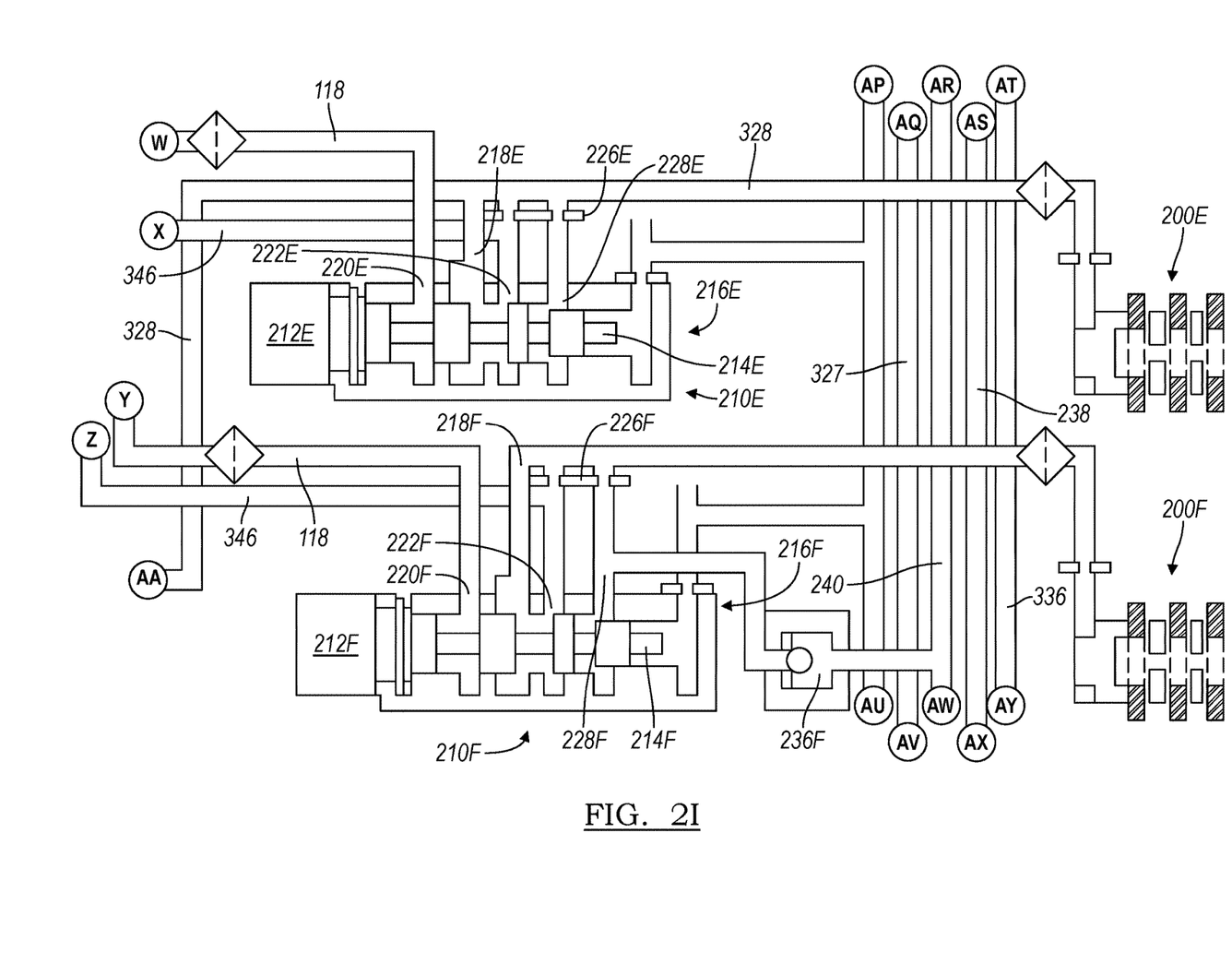

Referring now to FIGS. 2A and 2B, the hydraulic control system 100 includes a main, variable displacement pump 102 such as a vane pump that draws hydraulic fluid from a sump 104 through a filter 106 and provides pressurized hydraulic fluid in a first supply line 108. A pump blow off valve 112 releases overpressure in the supply line 108. The pump 102 may be driven by the engine 12 or by an auxiliary engine or electric motor (not illustrated). An electrically powered engine start-stop (ESS) auxiliary hydraulic pump 114 provides pressurized hydraulic fluid to an engine start-stop check valve 116 and thence to a second supply line 118. Alternatively, the auxiliary hydraulic pump 114 may be replaced by an accumulator (not illustrated). Fluid in the first supply line 108 is supplied to an inlet port 120D of a main regulator valve 120.

The main regulator valve 120 regulates delivered hydraulic pressure in the first supply line 108 as a function of the pressure in a control line 122 from an outlet port 130B of a pressure control and anti-backflow variable force solenoid (VFS) valve 130 to an inlet port 120A of the main regulator valve 120. The pressure control and anti-backflow valve 130 includes a solenoid 130S which translates a valve spool 130 V and a biasing spring 130K and receives fluid flow in the first supply line 108 at the inlet ports 130A and 130C. Similarly, it receives flow from the auxiliary pump 114 in the second supply line 118 at an inlet port 130D. Control port 130B is connected to the control line 122. If delivered fluid pressure starts to exceed or fall below a target value, the main regulator valve 120 opens or closes the inlet port 120D and closes or opens an outlet port 120C to decrease or increase in a fluid line 132 which in turn acts on a mechanism 134 of the variable displacement pump 102 to reduce or increase its displacement. An isolator valve or accumulator 136 is preferably disposed in the control line 122 to dampen oscillations. The pressure control and anti-backflow valve 130 also cuts off delivered fluid pressure to the second supply line 118 at near zero line pressure. This allows the auxiliary hydraulic pump 114 to pressurize the second supply line 118 when it is operating without back-feeding the first supply line 108 and the variable displacement pump 102. Similarly, the engine start-stop check valve 116 prevents back feeding the auxiliary hydraulic pump 114 when the engine driven variable displacement pump 102 is operating.

Referring now to FIGS. 2B, 2C, 2D, 2E and 2F, the pressure in the fluid line 132 also controls a combination VFS torque converter clutch and priority valve 140 through a port 140E. The VFS torque converter clutch and priority valve 140 includes a solenoid 140S, a two section valve spool 140V and a spring 140K that biases the two sections of the valve spool 140V apart. The priority valve 140 also includes an outlet port 140C to a hydraulic line 144 that feeds torque converter feed ports 150D and 150E of a torque converter regulator and control valve 150 only when the output from the main, variable displacement pump 102 is sufficient to achieve the target delivered pump pressure.

The torque converter regulator and control valve 150 includes a first valve spool 150R and a second aligned valve spool 150S. A converter return port 150C provides hydraulic fluid in a return line 152 which provides cooler and lubrication flow through an anti-drainback valve 154 to an inlet port 160B of a cooler bypass valve 160 and an inlet port 170A of a lubrication control valve 170. A pair of priority bypass orifices 156A and 156B ensure that the converter feed port 140D is not completely cut off when the delivered fluid pressure is below a target value and the bypass orifice 156A ensures that there is some feed to the return line 152 and the lubrication circuit, even when operating with only the auxiliary hydraulic pump 114. A torque converter feed blow off valve 158 in the hydraulic line 144 between the bypass orifices 156A and 156B limits the torque converter feed pressure to avoid over-pressurizing a torque converter 16 and a hydraulic fluid cooler 180 connected between the lines 174 and 182.

The torque converter regulator and control valve 150 is utilized to direct the torque converter feed flow in apply and release modes and control the apply pressure of the clutch 178 of the torque converter 16 in apply mode. The torque converter regulator and control valve 150 is regulated by the VFS portion of the VFS torque converter control and priority valve 140 from an outlet port 140B, through a hydraulic line 184, to a control port 150A of the torque converter regulator and control valve 150 and a damper 186 which damps oscillations in the pressure in the line 184. With the VFS portion of the torque converter control and priority valve 140 commanded off and the torque converter regulator and control valve 150 in an installed or relaxed position, the hydraulic flow is directed to the clutch 178 of the torque converter 16 through the apply fluid line 188 from the outlet port 150B of the torque converter regulator and control valve 150. The pressure in the fluid line 188A controls the torque capacity of the torque converter clutch 178. Fluid returns from the torque converter clutch 178 through the fluid line 188B and is directed out the port 150C to the return line 152 to the cooler bypass valve 160 and the lubrication control valve 170.

The anti-drainback valve 154 in the return line 152 prevents the torque converter clutch 178 from draining down through the cooler 180 and lubrication circuit with the engine 12 off. Fluid in the return line 152 is directed to the inlet port 160B of the cooler bypass valve 160 and, in the installed or relaxed position, directs fluid to the outlet port 160A and to the inlet port 170A of the lubrication control valve 170, out the outlet port 170B and to a lubrication line 174 and the lubrication circuit while bypassing the hydraulic fluid cooler 180. A thermal element 162 in the cooler bypass valve 160 expands upon a temperature rise of the transmission 14 and strokes the spool 164 of the bypass valve 160 to the right. In a stroked position, the spool 164 directs the fluid flow in the return line 152 to the outlet port 160C and thence to the fluid cooler 180 and the lubrication line 174. The lubrication control valve 170 limits the pressure in the lubrication line 174 and the lubrication circuit to a value dictated by a valve spring 176 by bleeding excess flow to an exhaust port 170C. Preferably, a hydraulic fluid temperature sensor 168 is disposed in the second fluid supply line and provides a real time indication of fluid temperature to the transmission control module 40.

Referring now to FIGS. 2D, 2G, 2H and 2I, the hydraulic control system 100 of the transmission 14 includes six torque transmitting devices, 200A through 200F, which may either be friction clutches or brakes and which are each controlled by separate linear variable force solenoid (VFS) and regulator valve combinations 210A through 210F. The linear force solenoids 212A through 212F apply a force on the ends of the valve spools 214A through 214F as a function of the electrical current to the solenoids. The regulator valves 216A through 216F connect the outlet ports 218A through 218F of the regulator valves 216A through 216F to either the pressurized hydraulic fluid in the second supply line 118 through the inlet ports 220A through 220F or the exhaust ports 222A through 222F and regulate clutch pressure between these two pressures by a force balance between pressure acting on a differential area on the valve spools 214A through 214F through a feedback orifice 226A through 226F, clutch feedback ports 228A through 228F and the force from the linear force solenoids 212A through 212F. The exhaust ports 222A through 222F are held at an exhaust back fill pressure that is regulated to a low value by an exhaust back-fill blow off valve 230 in a hydraulic exhaust line 232.

The clutch regulator valves 216A, 216B, 216C and 216F have a boost system. The clutch feedback ports 228A and 228B on the regulator valves are connected through one way ball check valves 236A and 236B to a hydraulic line 238 having feed limit pressure. A feed limit valve 250 includes an inlet port 250B which communicates through a check valve 251 to the first supply line 108. Feed limit pressure is clipped delivered pump pressure and appears at an outlet port 250A through an orifice 253 in the feed limit valve 250 by a force balance between a spring 252 and the feed limit pressure acting on an area of the feed limit valve spool 254 and also at an outlet port 250C. The clutch feedback ports 228C and 228F on the regulator valves 216C and 216F are connected through one way ball check valves 236C and 236F to a hydraulic line 240. A second feed limit valve 260 which is similar to the first feed limit valve 250 is utilized to create a second feed limit pressure, the first designated feed limit LO and the second designated feed limit HI. The feed limit valve 260 includes an inlet port 260B which communicates through the check valve 251 to the first supply line 108. HI feed limit pressure appears at an outlet port 260A through an orifice 263 by a force balance between a spring 262 and the feed limit pressure acting on an area of the feed limit valve spool 264 and also at an outlet port 260C.

The feed limit valve 250 LO output at the outlet ports 250A and 250C is provided to the line 238 and is utilized to regulate boost points on clutches or brakes 200A and 200B and the feed limit valve 260 HI output at the outlet ports 260A and 260C is provided to the line 240 and is utilized to regulate boost points on clutches or brakes 200C and 200F. When the clutch feedback pressure exceeds the respective feed limit pressure, the one way ball check valves 236A, 236B, 236C and 236F become unseated and this limits the feedback port pressure to the feed limit pressure. If the signals to the linear force solenoids 212A through 212F are increased, the regulator valves 216A through 216F are forced into their fully open positions and the applied clutch pressure equals the supply pressure in the second supply line 118.

Figure 2J:
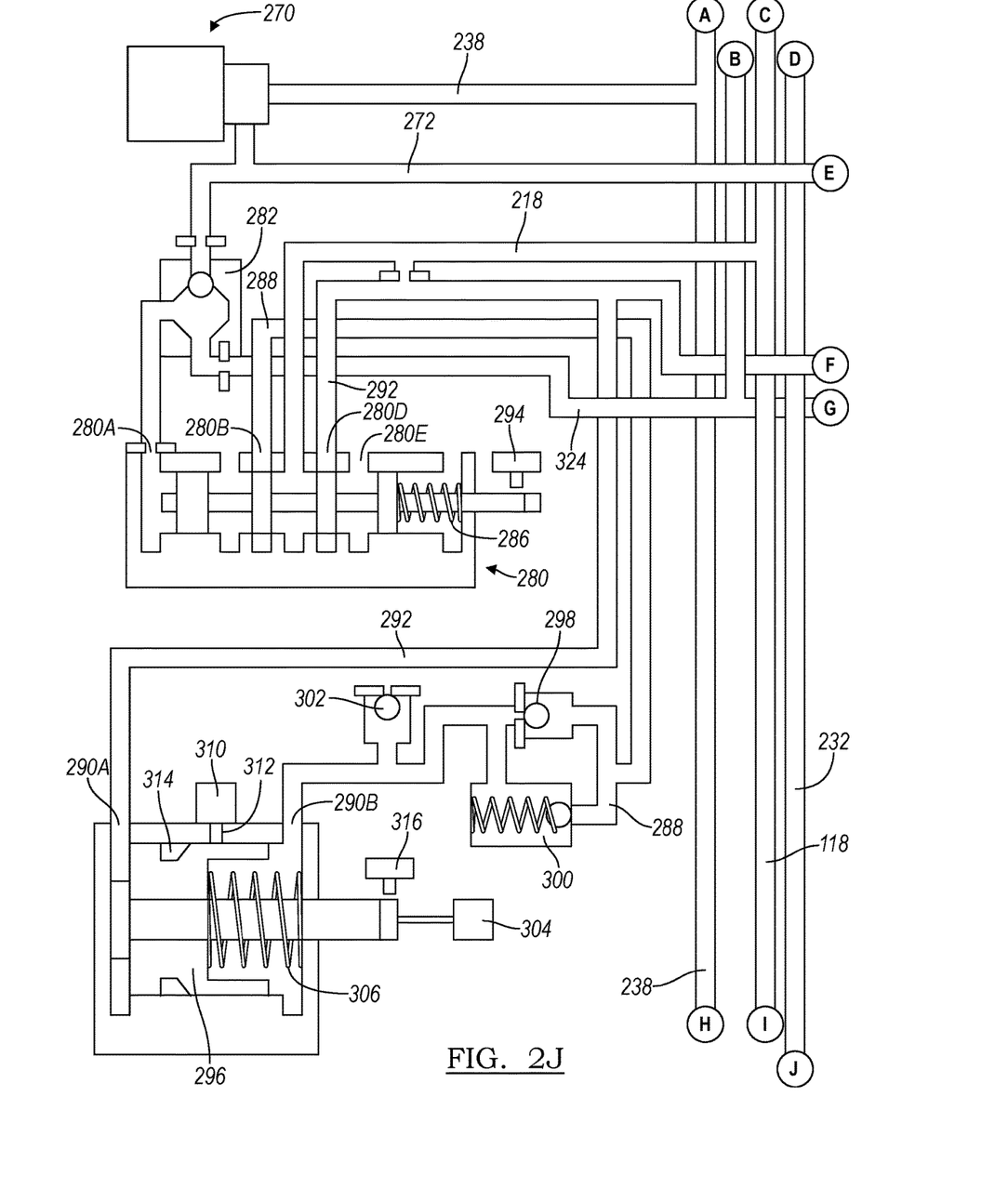

Referring now to FIG. 2J, a normally low on/off solenoid valve 270 utilizes and controls fluid at the feed limit LO pressure in the hydraulic line 238 and selectively provides it through a hydraulic line 272 to a control port 280A of an ETRS mode valve 280 through a two way check valve 282 and strokes the valve spool 284 against a spring 286 between a return-to-park position shown in FIG. 2J and an out-of-park position to the right in FIG. 2J. The ETRS mode valve 280 directs fluid at line pressure to the return-to-Park (RTP) side of an ETRS or park servo 290 through an outlet port 280B and a hydraulic line 288 in the installed or relaxed (Park) position of the valve spool 284 and to the out-of-Park (OOP) side of the park servo 290 though an outlet port 280D and a hydraulic line 292 in the extended or stroked position of the valve spool 284. The ETRS mode valve 280 includes a position sensor 294 which may be a Hall effect sensor having a stationary sensor and a magnet connected to the valve spool 284, though it should be appreciated that other types and arrangements of sensors may be used.

The ETRS or Park servo 290 includes ports 290A and 290B each located on either side of a piston 296. The port 290A is connected to the out-of-Park hydraulic line 292. The port 290B is connected to the return-to-Park hydraulic line 288 and a parallel one-way check valve 298 and a blow off valve 300. An air bleed check ball 302 is included between the parallel one-way check valve 298 and a blow off valve 300 and the port 290B of the park servo 290. The piston 296 is mechanically coupled to the Park mechanism 304 of the transmission 14. The piston 296 is moveable between a Park position (shown in FIG. 2J) and an out-of-Park position (where the piston 296 is moved to the right in FIG. 2J). A biasing member 306, such as a spring, biases the piston 296 to the left, Park position. In the Park position, the piston 296 engages the Park mechanism 304 placing the motor vehicle M in a Park mode of operation where the transmission output shaft 22 is mechanically locked and prevented from rotation.

Hydraulic fluid supplied to fluid port 290A moves the piston 296 of the park servo 290 against the force of the biasing member 306 to move the piston 296 to the out-of-Park position. Hydraulic fluid is supplied to the fluid port 290B to move the piston 296 to the Park position with the assistance of the spring 306. A Park inhibit solenoid 310 selectively restrains the piston 296 in the out-of-Park position. When energized, the plunger 312 of the Park inhibit solenoid 310 engages a notch 314 in the piston 296 and is capable of holding the piston 296 in the stroked, out-of-Park position against the spring 306. One or more Park servo position sensors 316 may be disposed proximate the piston 296 and are operable to detect its position. In the example provided, Park servo position sensors 316 are Hall effect sensors having stationary sensors and one or more magnets connected to the piston 296, though it should be appreciated that other types and arrangements of sensors may be used. The Park servo position sensor(s) 316 communicate with the transmission control module 40 and are used to confirm the location of the Park servo piston 296 and in diagnostics.

Figure 2K:
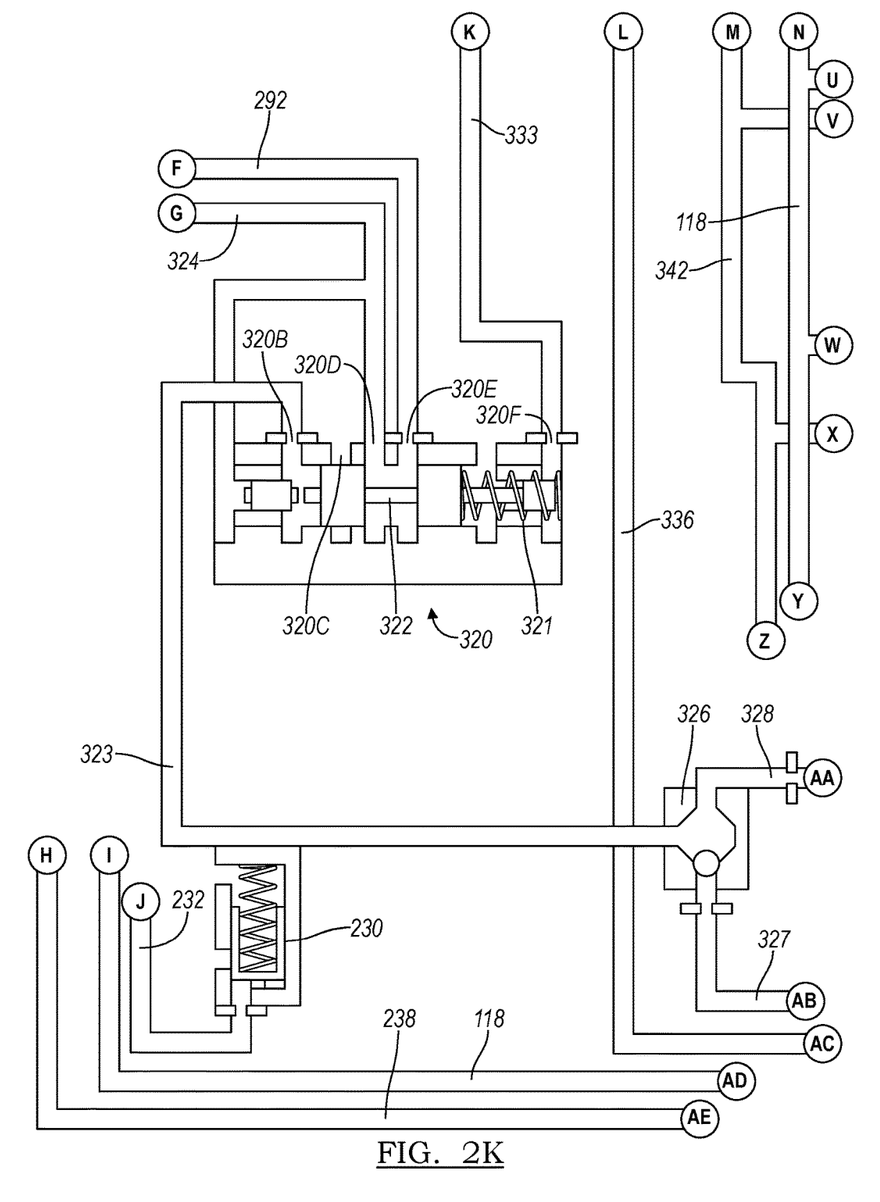

Referring now to FIGS. 2J and 2K, the out-of-Park fluid pressure in the hydraulic line 292 is also fed to an inlet port 320E of a drive select valve 320. The drive select valve 320 includes a spring 321 which biases a valve spool 322. A drive latch pressure is provided by an outlet port 320D of the drive select valve 320 in a hydraulic line 324. However, in the relaxed, installed position of the valve spool 322 of the drive select valve 320, this pressure is exhausted through an exhaust port 320C. The valve spool 322 of the drive select valve 320 can be stroked by fluid pressure in a line 323 from either clutch C in a line 327 or clutch E through a two way ball check valve 326. Either clutch C or clutch E is required for any of the forward gears (Drive). Neither clutch C nor clutch E is required for Park, Reverse or Neutral. Thus, the drive select valve 320 is a means of differentiating the Drive state of the transmission 14 from the Park, Reverse and Neutral states without additional components.

When the drive select valve 320 is in the stroked position, to the right in FIG. 2K, the out-of-Park pressure on the hydraulic line 292 provides a drive latch pressure. This drive latch pressure acts on a differential area of the spool 322 of the drive select valve 320 and latches it in its stroked position. This pressure also acts on the end of the ETRS mode valve 280 through the hydraulic line 324, the two way check valve 282 and the control port 280A and latches it in the stroked position, to the right in FIG. 2J. Finally and additionally, the drive latch pressure in the hydraulic line 324 is also fed to an inlet port 330E of a default disable valve 330 having a valve spool 332. Hydraulic pressure in a control port 330F of the default disable valve 330 which communicates with a control port 320F of the drive select valve 320 through a line 333 also communicates with a two way check valve 334, supplied with hydraulic fluid from both the output of the on-off solenoid valve 270 in the hydraulic line 272 and a hydraulic line 336 communicating with the hydraulic fluid provided to the clutch 200B. Fluid provided to the control port 320F of the drive select valve 320 can be utilized to break the latching function of the drive select valve 320.

When the default disable valve 330 is in the relaxed or installed position, the drive default circuit including the hydraulic line 342, a drive default blow off valve 344 and the associated exhaust lines 346 communicating with the regulator valves 216C through 216F are connected through the port 330D to the exhaust back-fill pressure in the line 232 through the port 330C. When the default disable valve 330 is in the stroked position, to the right against the bias of a spring 338, the hydraulic line 342, the drive default blow off valve 344 and the associated exhaust lines 346 are connected to the drive latch pressure in the line 324 through the port 330E. The feed limit LO pressure in the control port 330B connected to the hydraulic line 238 acts on a differential area of the valve spool 332 to move it to the stroked position against the bias of the spring 338.

Figure 2L:
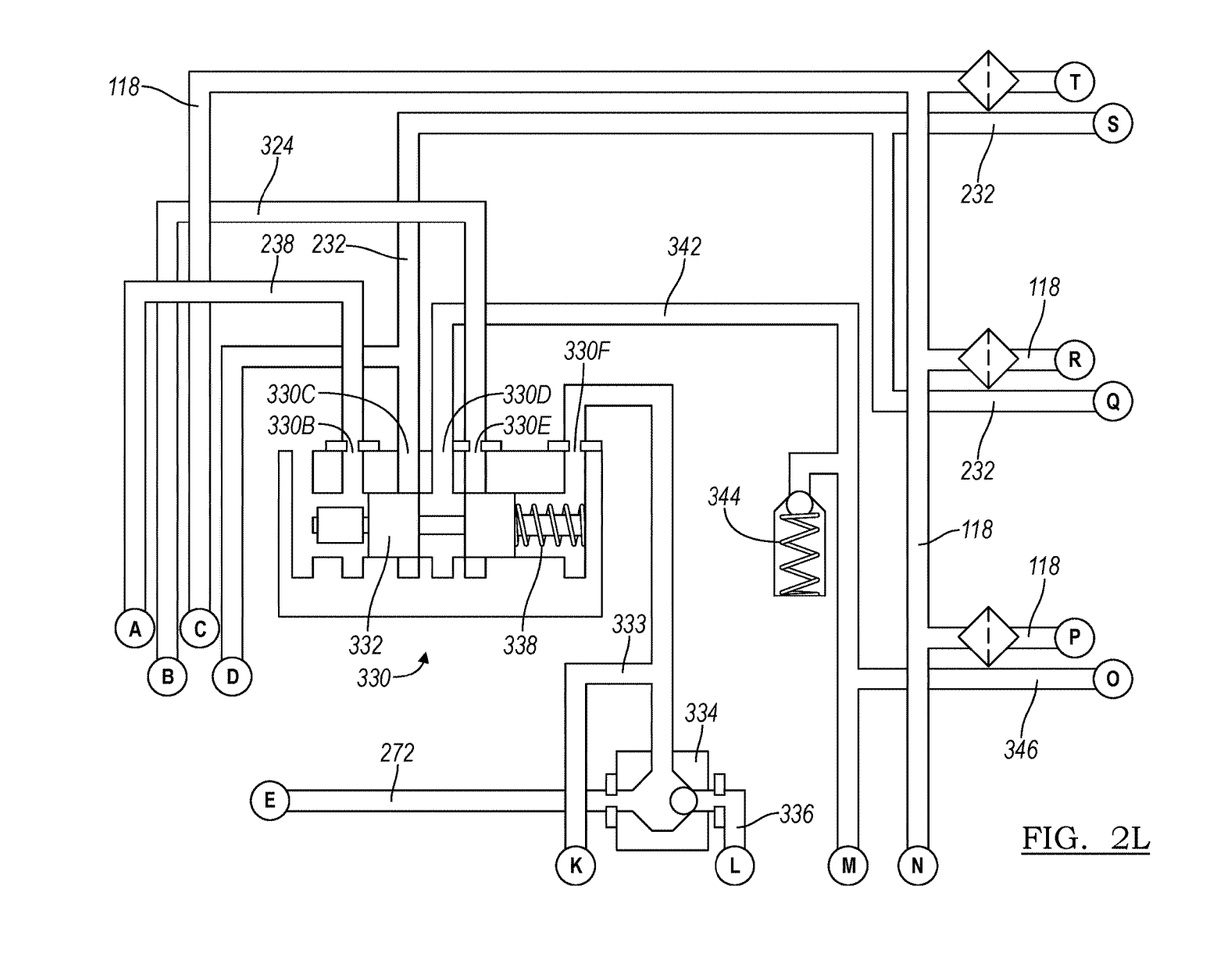

The output of the default disable solenoid 270 in the hydraulic line 272 or the clutch B regulator valve 216B in the line 336 acts on the end of the default disable valve spool 332 at control port 330F through the two way check valve 334 and maintains it in the installed or relaxed position illustrated in FIG. 2L under normal operating conditions against the feed limit LO pressure in the line 238 connected to the control port 330B. The exhaust ports 222C through 222F of the clutch regulator valves 216C through 216F are connected to drive default pressure in the line 324 and the exhaust lines 346. The exhaust ports 222A and 222B of the clutch regulator valves 216A and 216B are directly connected to the exhaust back-fill pressure in the line 232.

During normal operation, the default disable solenoid 270 is on or energized in out-of-Park operating mode and clutch 200B is actuated while in Park. The default disable pressure on the line 272 or the clutch 200B pressure keeps the default disable valve spool 332 in the relaxed or installed position, to the left in FIG. 2L. The drive default pressure is exhausted and thus all clutch regulator exhaust ports 222A through 222F are connected to exhaust back-fill in the lines 232, 342 and 346.

In Park, the default disable solenoid 270 is off or de-energized. Also in Park, the ETRS mode valve 280, the ETRS or Park servo 290 and the drive select valve 320 are their installed or relaxed positions. Out-of-Park hydraulic fluid in the line 292 is exhausted through the port 280E of the ETRS valve 280, return-to-Park hydraulic fluid in the line 288 is connected to line pressure in the second hydraulic line 118 through the port 280D and drive latch hydraulic fluid is exhausted though the control port 280A.

The default disable solenoid 270 is turned on to achieve out-of-Park. This strokes the spool 242 of the ETRS valve 280 and pressurizes the line 292 with line pressure which, in turn, strokes the ETRS or Park servo 290 and pulls the Park pawl out of the park gear in the park mechanism 304. The linear position changes of the spool 284 of the ETRS valve 280 and the piston 296 of the ETRS or Park servo 290 are sensed by the position sensors 294 and 316. The Park inhibit solenoid 310 is turned on to hold the piston 296 of the ETRS or Park servo 280 in the out-of-park (stroked) position in case the vehicle operator turns the ignition and engine off, thus causing a loss of out-of-Park pressure in the hydraulic line 292. The return-to-Park blow off 300 ensures that as long as pressure in the line 288 is maintained below the return-to-park blow off pressure, there will be no pressure seen at the spring end of the ETRS or Park servo 290 during a subsequent engine start. This avoids the possibility of accidentally overcoming the locking force of the Park inhibit solenoid 310 and pushing the park pawl of the park mechanism 304 into Park.

In reverse and neutral, clutches 200C and 200E remain off, the drive select valve 320 stays in the relaxed or installed position and drive latch hydraulic fluid in the line 324 is exhausted through the exhaust port 320C. If the transmission control module 40 is in a default state such that all solenoids are powered off, the default disable solenoid valve 270 output pressure in the line 272 will drop to zero and the ETRS valve 280 will return to the installed or relaxed position. Hydraulic fluid in the out-of-Park line 292 will be exhausted and hydraulic fluid in the return-to-Park line 288 will become pressurized. Finally, the Park inhibit solenoid 310 will be de-energized and the piston 296 of the ETRS or Park servo 290 will de-stroke and return to its relaxed or installed position, thereby engaging Park in the Park mechanism 304.

When drive is commanded by the vehicle operator, at least one of clutch 200C or clutch 200F, as noted above, is activated or engaged. This strokes the drive select valve spool 322 and pressurizes the drive latch hydraulic fluid in the line 324 with fluid from the out-of-Park fluid in the line 292. During a transmission control module default from Drive, the drive latch fluid in the line 324 will latch the ETRS mode valve 280 and the drive select valve 320 on the stroked positions and prevent the ETRS or park servo 290 from de-stroking or returning to Park. In addition, as the default disable solenoid valve 270 output pressure in the line 272 and the fluid pressure to the clutch 200B drop to zero, the feed limit LO pressure in the hydraulic line 238 strokes the default disable valve 330. The drive default fluid in the line 342 from the port 330D of the default disable valve 330 which is connected to the exhaust ports 222C through 222F of the clutch regulator valves 216C through 216F is then pressurized by the drive latch fluid in the line 324. This engages the four clutches 200C through 200F and achieves seventh gear when defaulting from drive. It should be appreciated that the recitation of seventh gear in the foregoing explanation is by way of example only and that other default gears, depending primarily upon the number of forward gears of the transmission may, and will be, suitable forward default gears such as third, fourth, fifth sixth or a higher gear.

When shifting out of Drive (to Reverse, Neutral or Park), clutch 200C and clutch 200E fluid pressure is exhausted and clutch 200B is pressurized or engaged. Pressurized hydraulic fluid provided to clutch 200B acts on the spring end of the valve spool 322 through the port 320G of the drive select valve 320, overcomes the latch force and moves the spool 322 back to the installed or relaxed position.

An orifice 348 disposed at the port 330E of the default disable valve 330 reduces the rate of pressure rise in the drive default hydraulic lines 342 and 346 and the drive default blow off 344 in the hydraulic line 342 limits the maximum pressure at the clutches 200C and 200F when defaulting from the Drive mode. This minimizes the possibility of torque spikes which may cause a failure during the default from lower gears to the seventh or other preselected gear.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic control system for a motor vehicle automatic transmission comprising, in combination,
a hydraulic pump having a fluid output,
a pump regulator valve for adjusting said fluid output of said pump,
a torque converter having a lock up clutch,
a torque converter regulator valve receiving said fluid output of said pump and providing controlled fluid flow to said lock up clutch of said torque converter,
a first feed limit valve providing a first, lower pressure output,
a second feed limit valve providing a second, higher pressure output,
a plurality of torque transmitting devices having hydraulic actuators receiving outputs from a like plurality of regulator valves controlled by respective variable force solenoids, said first, lower pressure output provided to a first pair of said hydraulic actuators and said second, higher pressure output provided to a second pair of said hydraulic actuators,
an electronic transmission range selector control valve having a return-to-park output and a control port,
a default disable control valve having a control port,
a park servo having a piston and a first, out-of-park port and a second, return-to-park port in fluid communication with said return-to-park output of said transmission range selector control valve,
a drive select control valve having a control port and a fluid output communicating with said first, out-of-park port of said park servo, and
a two position default disable solenoid valve having an input provided with said first, lower pressure output of said feed limit valve and an output selectively provided to said control ports of said electronic transmission range selector control valve, said default disable control valve and said drive select control valve.

2. The hydraulic control system for a motor vehicle automatic transmission of claim 1 further including a check valve operably disposed between said output of said default disable solenoid valve and said control port of said electronic transmission range selector control valve.

3. The hydraulic control system for a motor vehicle automatic transmission of claim 1 wherein said park servo piston is coupled to a park mechanism of said automatic transmission.

4. The hydraulic control system for a motor vehicle automatic transmission of claim 3 further including a transmission control module and a park position sensor for sensing a position of said piston of said park servo and providing an output to said transmission control module.

5. The hydraulic control system for a motor vehicle automatic transmission of claim 1 wherein said control ports of said default disable control valve and said drive select control valve are in fluid communication and further including a check valve having a port in fluid communication with said control port of said default disable solenoid valve.

6. The hydraulic control system for a motor vehicle automatic transmission of claim 5 wherein said check valve is a two way check valve and further includes a hydraulic fluid connection to an output of one of said regulator valves to one of said hydraulic actuators.

7. The hydraulic control system for a motor vehicle automatic transmission of claim 1 further including a fluid return line from said torque converter lock up clutch, a hydraulic fluid cooler and a cooler bypass valve operably disposed between said fluid return line and said hydraulic fluid cooler.

8. The hydraulic control system for a motor vehicle automatic transmission of claim 1 further including a transmission control module and a range sensor for sensing a position of a valve spool of said electronic transmission range selector control valve and providing an output to said transmission control module.

9. The hydraulic control system for a motor vehicle automatic transmission of claim 1 further including an engine start stop hydraulic pump having an output and a check valve controlling said output.

10. A hydraulic control system for a motor vehicle automatic transmission having an electronic transmission range selector comprising, in combination,
a variable displacement hydraulic pump having a fluid output,
a pump regulator valve for adjusting said fluid output of said pump,
a torque converter having a lock up clutch,
a torque converter regulator valve receiving said fluid output of said pump and providing controlled fluid flow to said lock up clutch of said torque converter,
a first feed limit valve providing a first, lower pressure output,
a second feed limit valve providing a second, higher pressure output,
a plurality of torque transmitting devices having hydraulic actuators receiving fluid outputs from regulator valves controlled by variable force solenoids, said first, lower pressure output provided through said regulator valves to a first pair of said hydraulic actuators and said second, higher pressure output provided through said regulator valves to a second pair of said hydraulic actuators,
an electronic transmission range selector control valve having a return-to-park output and a control port,
a default disable control valve having a control port,
a park servo having a piston coupled to a park mechanism of said automatic transmission and a first, out-of-park port on a first side of said piston and a second, return-to-park port on a second side of said piston in fluid communication with said return-to-park output of said transmission range selector control valve,
a drive select control valve having a control port and an out-of-park output communicating with said first, out-of-park port of said park servo, and
a two position default disable solenoid valve having an input provided with said first, lower pressure output of said feed limit valve and an output selectively provided to said control ports of said electronic transmission range selector control valve, said default disable control valve and said drive select control valve.

11. The hydraulic control system for a motor vehicle automatic transmission of claim 10 further including an engine start stop hydraulic pump having an output and a check valve controlling said output.

12. The hydraulic control system for a motor vehicle automatic transmission of claim 10 further including a transmission control module and a park position sensor for sensing a position of a piston of said park servo and providing an output to said transmission control module.

13. The hydraulic control system for a motor vehicle automatic transmission of claim 10 further including a transmission control module and a range sensor for sensing a position of a valve spool of said electronic transmission range selector control valve and providing an output to said transmission control module.

14. The hydraulic control system for a motor vehicle automatic transmission of claim 10 further including a check valve operably disposed between said output of said default disable solenoid valve and said control port of said electronic transmission range selector control valve.

15. The hydraulic control system for a motor vehicle automatic transmission of claim 10 wherein said control ports of said default disable control valve and said drive select control valve are in fluid communication and further including a check valve having a port in fluid communication with said control port of said default disable solenoid valve.

16. The hydraulic control system for a motor vehicle automatic transmission of claim 15 wherein said check valve is a two way check valve and further includes a hydraulic fluid connection to an output of one of said regulator valves to one of said hydraulic actuators.

17. The hydraulic control system for a motor vehicle automatic transmission of claim 10 further including a fluid return line from said torque converter lock up clutch, a hydraulic fluid cooler and a cooler bypass valve operably disposed between said fluid return line and said hydraulic fluid cooler.

* * * * *